United States Patent
Ichikawa et al.

(10) Patent No.: US 8,416,998 B2
(45) Date of Patent: Apr. 9, 2013

(54) INFORMATION PROCESSING DEVICE, INFORMATION PROCESSING METHOD, AND PROGRAM

(75) Inventors: Kiyoto Ichikawa, Tokyo (JP); Kazumi Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/019,524

(22) Filed: Feb. 2, 2011

(65) Prior Publication Data
US 2011/0235870 A1 Sep. 29, 2011

(30) Foreign Application Priority Data
Mar. 25, 2010 (JP) ................................. 2010-070495

(51) Int. Cl.
*G06K 9/00* (2006.01)

(52) U.S. Cl.
USPC ......................................... 382/118; 382/103

(58) Field of Classification Search .................. 382/103, 382/118; 704/246
See application file for complete search history.

(56) References Cited

U.S. PATENT DOCUMENTS

| | | | | |
|---|---|---|---|---|
| 6,219,639 | B1* | 4/2001 | Bakis et al. | 704/246 |
| 7,027,054 | B1* | 4/2006 | Cheiky et al. | 345/473 |
| 7,999,857 | B2* | 8/2011 | Bunn et al. | 348/211.1 |
| 2011/0131041 | A1* | 6/2011 | Cortez et al. | 704/235 |
| 2011/0235870 | A1* | 9/2011 | Ichikawa et al. | 382/118 |

FOREIGN PATENT DOCUMENTS

| | | |
|---|---|---|
| JP | 9-179583 | 7/1997 |
| JP | 2009-259269 | 11/2009 |

* cited by examiner

*Primary Examiner* — Gregory M Desire
(74) *Attorney, Agent, or Firm* — Oblon, Spivak, McClelland, Maier & Neustadt, L.L.P.

(57) ABSTRACT

An information processing device includes an imaging unit configured to perform imaging of one of the object person and a registrant, a first feature amount calculation unit configured to calculate a feature amount of a face of the registrant, a second feature amount calculation unit configured to calculate time series of feature amount of a lip of the registrant, a registration unit configured to register the time series of feature amount of the lip in a database to be associated with the feature amount of the face of the registrant, an identification unit configured to identify the face of the object person, a recognition unit configured to recognize speech content of the object person, and an authentication unit configured to perform personal authentication of the object person based on an identification result of the face and a recognition result of the speech content of the object person.

7 Claims, 4 Drawing Sheets

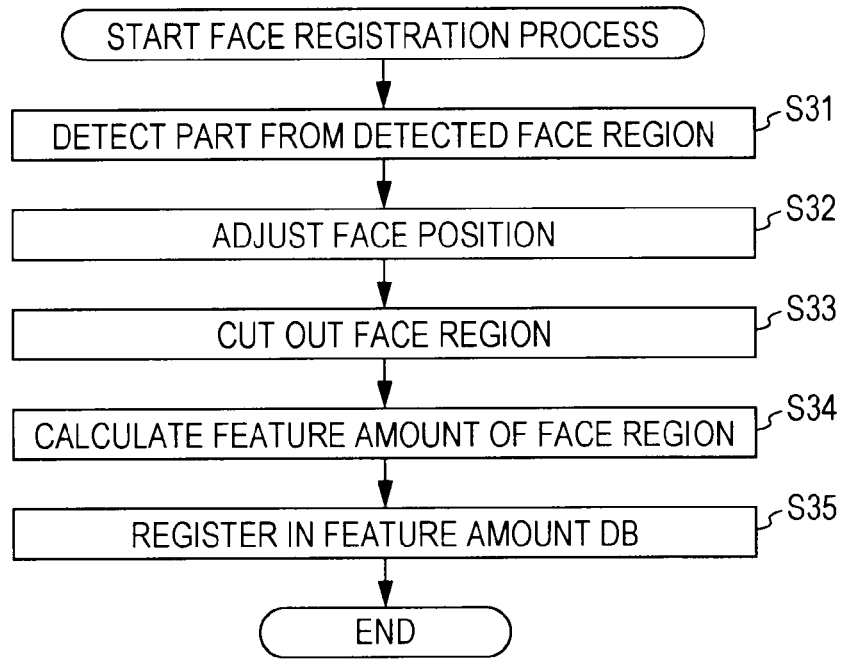
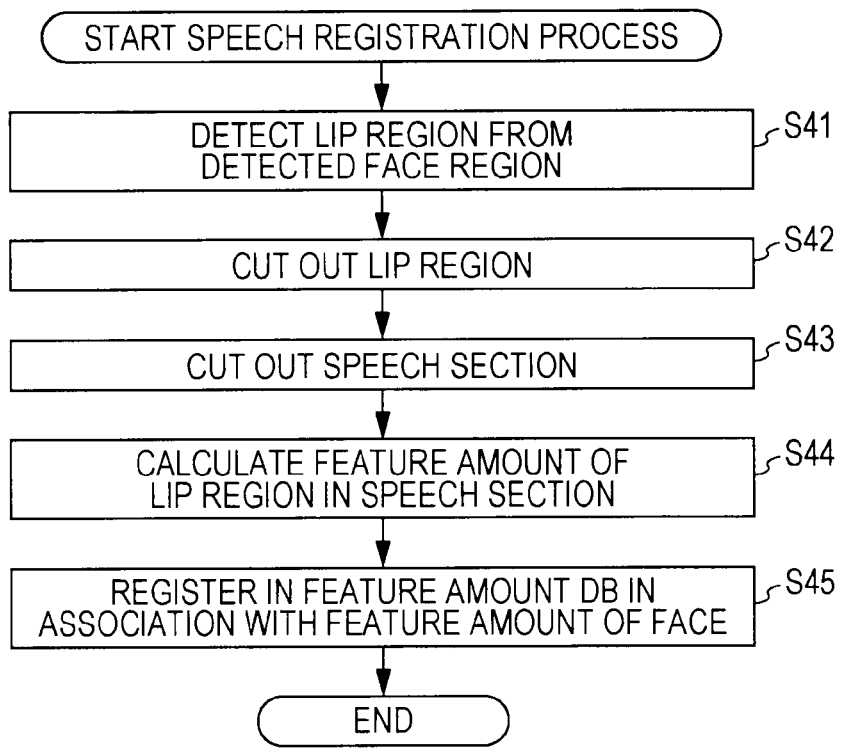

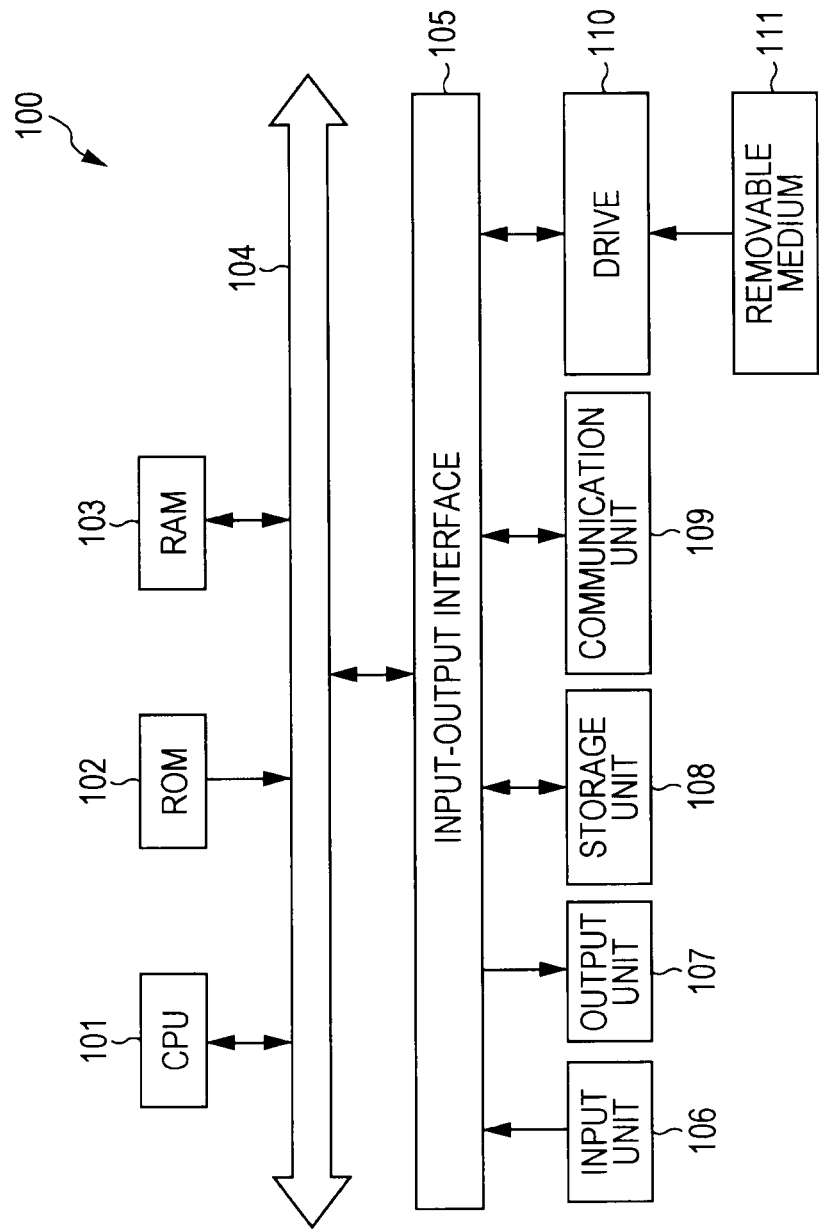

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program, and particularly relates to an information processing device, an information processing method, and a program in which accuracy of personal authentication is improved by combining facial identification and speech recognition through lip reading when a password is spoken.

2. Description of the Related Art

In recent years, image recognition technology has been improving. A facial identification technique, which is one field thereof, has reached a practical level and is used in, for example, an authentication device for controlling a lock for entrance into a security area.

In addition to the facial identification technique, proposals have been made to improve security level by, for example, obtaining input of a PIN number, password, or the like or adding ID card authentication (e.g., Japanese Unexamined Patent Application Publication No. 2009-259269) or adding verification through sound recognition of a spoken password (e.g., Japanese Unexamined Patent Application Publication No. 9-179583).

SUMMARY OF THE INVENTION

As described above, it is possible to improve security level by using the facial identification technique with an additional authentication technique (e.g., input of a PIN number or a password, presentation of an ID card, or sound recognition of a password).

However, input of a PIN number or a password involves an input device such as a keyboard, and adding presentation of an ID card involves a reader device.

Also, sound recognition of a spoken password involves not only a sound input device such as a microphone but also a risk of leakage due to the spoken password being heard.

Thus, it is desirable to provide a security level higher than when only the facial identification technique is used, without providing an input device other than an imaging unit.

An information processing device according to an embodiment of the present invention which performs personal authentication based on a video signal obtained through imaging of an object person includes imaging means for performing imaging of one of the object person and a registrant to generate the video signal, first feature amount calculation means for calculating a feature amount of a face of the registrant in an image of the video signal obtained through imaging of the registrant in a registration mode, second feature amount calculation means for calculating time series of feature amount of a lip of the registrant in an image of the video signal obtained through imaging of the registrant speaking an arbitrary password in the registration mode, registration means for registering the calculated time series of feature amount of the lip when the arbitrary password is spoken in a database to be associated with the calculated feature amount of the face of the registrant, identification means for calculating a feature amount of a face in an image of the video signal obtained through imaging of the object person, referencing the database, and identifying the face of the object person in an authentication mode, recognition means for calculating time series of feature amount of a lip of the object person in an image of the video signal obtained through imaging of the object person while speaking, referencing the database, and recognizing speech content of the object person in the authentication mode, and authentication means for performing personal authentication of the object person based on an identification result of the face of the object person and a recognition result of the speech content of the object person.

The recognition means may recognize the speech content of the object person based on whether the calculated time series of feature amount of the lip of the object person matches with the time series of feature amount of the lip when the arbitrary password is spoken by the registrant already registered in the database.

The recognition means may further calculate the time series of feature amount of the lip of the registrant in an image of the video signal obtained through imaging of the registrant while speaking, reference the database, and recognize speech content of the registrant in the authentication mode. The information processing device according to the embodiment of the present invention may further include mode switching means for switching from the authentication mode to the registration mode according to the recognized speech content of the registrant.

The first feature amount calculation means may calculate the feature amount of the face of the registrant in an image of the video signal obtained through imaging of the registrant while speaking in the registration mode. The identification means may calculate the feature amount of the face in an image of the video signal obtained through imaging of the object person while speaking, reference the database, and identify the face of the object person in the authentication mode.

According to another embodiment of the present invention, an information processing method performed by an information processing device which performs personal authentication based on a video signal obtained through imaging of an object person includes a first feature amount calculation step of calculating a feature amount of a face of a registrant in an image of the video signal obtained through imaging of the registrant in a registration mode, a second feature amount calculation step of calculating time series of feature amount of a lip of the registrant in an image of the video signal obtained through imaging of the registrant speaking an arbitrary password in the registration mode, a registration step of registering the calculated time series of feature amount of the lip when the arbitrary password is spoken in a database to be associated with the calculated feature amount of the face of the registrant, an identification step of calculating a feature amount of a face in an image of the video signal obtained through imaging of the object person, referencing the database, and identifying the face of the object person in an authentication mode, a recognition step of calculating time series of feature amount of a lip of the object person in an image of the video signal obtained through imaging of the object person while speaking, referencing the database, and recognizing speech content of the object person in the authentication mode, and an authentication step of performing personal authentication of the object person based on an identification result of the face of the object person and a recognition result of the speech content of the object person.

According to still another embodiment of the present invention, a program for controlling an information processing device which performs personal authentication based on a video signal obtained through imaging of an object person makes a computer of the information processing device execute a process including a first feature amount calculation step of calculating a feature amount of a face of a registrant in an image of the video signal obtained through imaging of the registrant in a registration mode, a second feature amount calculation step of calculating time series of feature amount of a lip of the registrant in an image of the video signal obtained through imaging of the registrant speaking an arbitrary password in the registration mode, a registration step of registering the calculated time series of feature amount of the lip when the arbitrary password is spoken in a database to be associated with the calculated feature amount of the face of the registrant, an identification step of calculating a feature amount of a face in an image of the video signal obtained through imaging of the object person, referencing the database, and identifying the face of the object person in an authentication mode, a recognition step of calculating time series of feature amount of a lip of the object person in an image of the video signal obtained through imaging of the object person while speaking, referencing the database, and recognizing speech content of the object person in the authentication mode, and an authentication step of performing personal authentication of the object person based on an identification result of the face of the object person and a recognition result of the speech content of the object person.

According to the embodiments of the present invention, the feature amount of the face of the registrant in the image of the video signal obtained through imaging of the registrant is calculated in the registration mode, the time series of feature amount of the lip of the registrant in the image of the video signal obtained through imaging of the registrant speaking the arbitrary password is calculated in the registration mode, and the calculated time series of feature amount of the lip when the arbitrary password is spoken is registered in the database to be associated with the calculated feature amount of the face of the registrant. Also, the feature amount of the face in the image of the video signal obtained through imaging of the object person is calculated, the database is referenced, and the face of the object person is identified in the authentication mode, and the time series of feature amount of the lip of the object person in the image of the video signal obtained through imaging of the object person while speaking is calculated, the database is referenced, and the speech content of the object person is recognized in the authentication mode. Then, the personal authentication of the object person is performed based on the identification result of the face of the object person and the recognition result of the speech content of the object person.

According to the embodiments of the present invention, a security level higher than when only the facial identification technique is used can be provided, without providing an input device other than an imaging unit.

BRIEF DESCRIPTION OF THE DRAWINGS

FIG. 3 is a flowchart illustrating a face registration process;

FIG. 4 is a flowchart illustrating a speech registration process; and

FIG. 5 is a block diagram showing a configuration example of a computer.

DESCRIPTION OF THE PREFERRED EMBODIMENTS

Best mode (referred to below as embodiment) for carrying out the present invention will be described below in detail with reference to the accompanying drawings.

1. Embodiment

Configuration Example of a Personal Authentication/Unlocking Device

Figure 1:
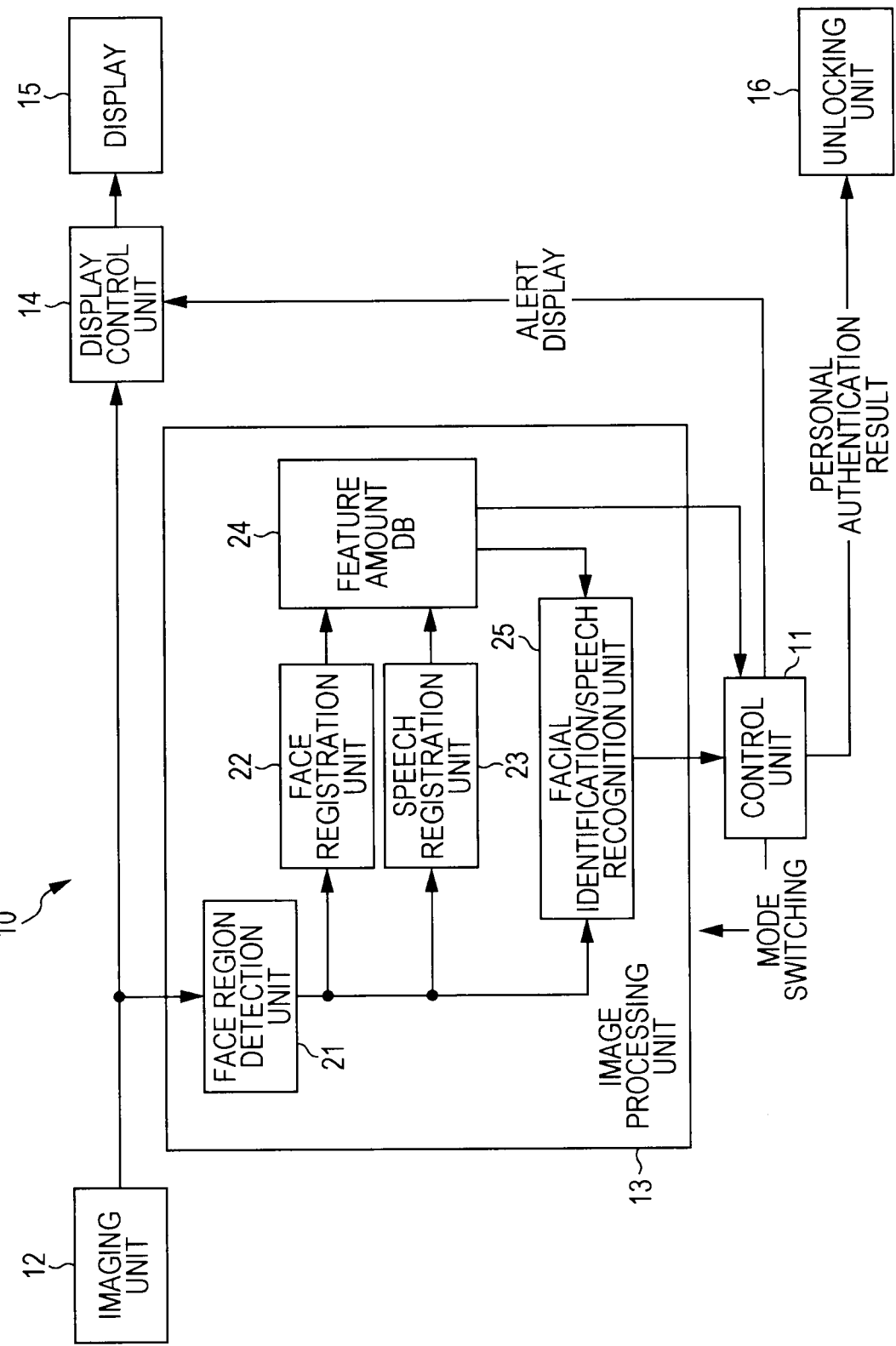
FIG. 1 is a block diagram showing a configuration example of a personal authentication/unlocking device according to an embodiment of the present invention.

FIG. 1 shows a configuration example of a personal authentication/unlocking device according to an embodiment of the present invention. This personal authentication/unlocking device 10 performs facial identification through imaging of a face of an object person, recognizes a spoken password based on lip movement of the object person, and performs personal authentication based on a result of the facial identification and a recognition result of the password. Then, according to an authentication result, the personal authentication/unlocking device 10 unlocks a door for entering a security area, for example.

Note that the object person is to move the lip in a voiceless state without an actual voice, in a similar manner to when the password is spoken. Accordingly, leakage due to the password being heard can be prevented.

In the description below, a speech refers to a movement of a lip in a voiceless state as described above. Note that recognition of a password is possible also through speech with voice. However, in that case, leakage of the password due to the voice being heard is obviously not prevented.

The personal authentication/unlocking device 10 includes a control unit 11, an imaging unit 12, an image processing unit 13, a display control unit 14, a display 15, and an unlocking unit 16.

The control unit 11 controls the entire personal authentication/unlocking device 10. Particularly, the control unit 11 sets an operation mode (i.e., registration mode or authentication mode) of the image processing unit 13 based on a speech recognition result input from the image processing unit 13. Also, the control unit 11 generates an image signal for an alert display, outputs the image signal to the display control unit 14, and causes the display 15 to display the alert display. Further, the control unit 11 determines success or failure of the personal authentication based on a facial identification result and speech content input from the image processing unit 13 and notifies the unlocking unit 16 of a personal authentication result (i.e., success or failure).

Note that a switch or the like for a user to instruct switching of the operation mode (i.e., registration mode or authentication mode) of the image processing unit 13 may be provided to set the operation mode of the image processing unit 13 according to an operation of the switch by the user.

Formed of a digital video camera and the like capable of imaging a moving image, the imaging unit 12 performs imaging of the object person speaking a password and outputs a video signal obtained as a result to the image processing unit 13 and the display control unit 14.

The image processing unit 13 includes a face region detection unit 21, a face registration unit 22, a speech registration unit 23, a feature amount database (DB) 24, and a facial identification/speech recognition unit 25. The image processing unit 13 operates in a state of the registration mode or the authentication mode.

The face region detection unit 21 detects a region of a face (i.e., face region) of the object person from an image of the video signal input from the imaging unit 12. Then, the face region detection unit 21 outputs the detected face region to the face registration unit 22 and the speech registration unit 23 in the registration mode or to the facial identification/speech recognition unit 25 in the authentication mode. Also, when a face of a person is not detected or more than one face is detected from the image of the video signal input from the imaging unit 12, the face region detection unit 21 notifies the control unit 11 accordingly.

In the registration mode, the face registration unit 22 calculates a feature amount based on the face region input from the face region detection unit 21 and registers the feature amount in the feature amount DB 24. Any available method may be applied as a method of calculating the feature amount of a face. One example is a method (published as Japanese Unexamined Patent Application Publication No. 2009-53916) which has been proposed by the applicant of the present invention. Specifically, to put it shortly, feature amounts of prepared face images of X people are respectively calculated with a predetermined method in advance, and a value showing the degree of resemblance of a face of a registrant with respect to each face of the X people is calculated, whereby feature amounts in X dimensions are calculated. Further, there is also a method of compressing the feature amounts in X dimensions into fewer dimensions.

Based on the face region input from the face region detection unit 21, the speech registration unit 23 detects the lip when the password is spoken, calculates a feature amount (i.e., time series of feature amount) of a movement of the lip, and registers the feature amount in the feature amount DB 24 to be associated with the feature amount of the face. Any available method may be applied as a method of calculating the feature amount of lip movement. One example is a method (i.e., Japanese Patent Application No. 2009-154924) which has been proposed by the applicant of the present invention. Specifically, to put it shortly, association between a spoken sound and a shape of a lip (i.e., viseme) is learned, and a feature amount of lip movement when a password is spoken by a registrant is obtained as time series of change in viseme.

Registered in the feature amount DB 24 are the feature amount of the face of the registered object person and, in association therewith, the time series of feature amount of the lip while the password is spoken by a speaker (i.e., the registered object person). Also registered in the feature amount DB 24 is time series of feature amount of a lip obtained through learning in advance when a command ("register", "register face", or "register password") for instructing registration is spoken by an unspecified speaker.

In the authentication mode, the facial identification/speech recognition unit 25 calculates the feature amount based on the face region input from the face region detection unit 21 in a similar manner to the face registration unit 22 and determines whether the face of the object person is already registered by referencing the feature amount DB 24. Also, in the authentication mode, the facial identification/speech recognition unit 25 calculates the time series of feature amount of the lip when the object person is speaking based on the lip movement in the face region input from the face region detection unit 21 in a similar manner to the speech registration unit 23 and recognizes the speech content by referencing the feature amount DB 24. Then, the facial identification/speech recognition unit 25 notifies the control unit 11 of the facial identification result and the speech recognition result (i.e., speech content).

The display control unit 14 superimposes the image signal for the alert display appropriately input from the control unit 11 over the video signal input from the imaging unit 12 and supplies the video signal to the display 15. The display 15 displays an image based on the video signal input from the display control unit 14. The object person speaks a predetermined command or password while looking at and adjusting the position of his/her face displayed in the display 15.

The unlocking unit 16 unlocks, for example, a door to a security area when success of the personal authentication is notified by the control unit 11.

[Description on Operation]

Figure 2:
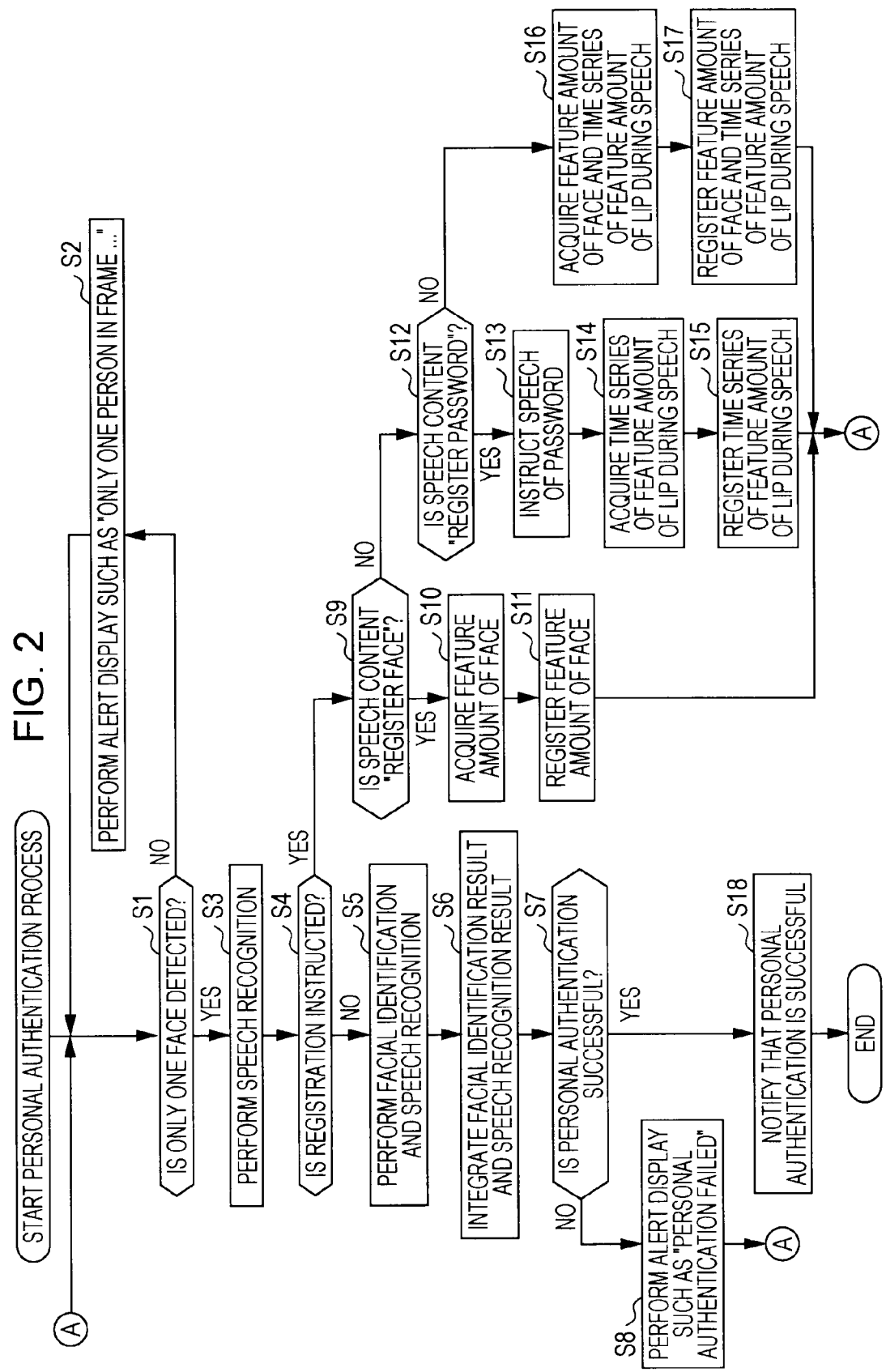
FIG. 2 is a flowchart illustrating a personal authentication process.

Next, an operation of the personal authentication/unlocking device 10 is described through a case of, for example, unlocking upon authentication of the object person who has completed registration of his/her face and password. FIG. 2 is a flowchart illustrating a personal authentication process by the personal authentication/unlocking device 10.

This personal authentication process is started when the power of the personal authentication/unlocking device 10 is turned on and continues to be executed thereafter until the power is turned off.

In step S1, the control unit 11 sets the image processing unit 13 to the registration mode. The imaging unit 12 starts imaging and outputs the video signal obtained as a result to the image processing unit 13 and the display control unit 14. The display control unit 14 causes the display 15 to display the image of the video signal input from the imaging unit 12. The face region detection unit 21 monitors the video signal being continually input from the imaging unit 12 and determines whether only one face of a person (i.e., object person) has been detected from the image.

When a face of a person is not detected or more than one face is detected in step S1, the process proceeds to step S2. In step S2, the control unit 11 generates the image signal for the alert display such as, for example, "only one person in frame, please" and outputs the image signal to the display control unit 14. The display control unit 14 superimposes this alert display over the video signal from the imaging unit 12 and causes the display 15 to display the image.

Herein, when an unregistered object person enters an imaging range of the imaging unit 12, detection of his/her face causes the process to proceed from step S1 to step S3.

In step S3, the face region detection unit 21 outputs the face region of the object person detected from the video signal from the imaging unit 12 to the facial identification/speech recognition unit 25. The facial identification/speech recognition unit 25 calculates the time series of feature amount of the lip within the face region and recognizes the speech content by referencing the feature amount DB 24. Note that accuracy to an extent that the command ("register", "register face", or "register password") for instructing registration is distinguishable is enough (i.e., the accuracy may be lower than in the speech recognition in step S5 described later) for recognition of the speech content at this stage. Then, the facial identification/speech recognition unit 25 notifies the control unit 11 of the speech recognition result (i.e., speech content).

In step S4, the control unit 11 determines whether the speech content of the object person is the command ("register", "register face", or "register password") for instructing registration. When the command for instructing registration is determined, the process proceeds to step S9. On the other hand, when the command for instructing registration is not determined, the process proceeds to step S5.

For now, neither the command nor the password is spoken by the object person, and thus the process proceeds to step S5.

In step S5, the facial identification/speech recognition unit 25 calculates the feature amount of the face region input from the face region detection unit 21 and determines whether the face of the object person is already registered by referencing the feature amount DB 24. Note that the feature amount of the face region may be calculated from one frame of the moving image or calculated as time series of feature amount from several frames.

Further, the facial identification/speech recognition unit 25 calculates the time series of feature amount of the lip in the face region and determines whether there is a match with those associated with the face in the facial identification result (i.e., whether a difference is less than or equal to a predetermined threshold value) by referencing the feature amount DB 24. That is, whether the spoken password matches the password associated with the registered face is determined. Then, the facial identification/speech recognition unit 25 notifies the control unit 11 of the facial identification result and the speech recognition result (in this case, information on whether the password is a match).

The control unit 11 integrates the facial identification result and the speech recognition result notified by the facial identification/speech recognition unit 25 in step S6 and determines whether the personal authentication has succeeded in step S7. Specifically, the process proceeds to step S18 upon determining success of the personal authentication only when it is determined that the face is already registered in the facial identification result and the speech recognition result matches with the password associated with the registered face. Otherwise, the process proceeds to step S8.

For now, the object person is unregistered and the speech content is unknown (i.e., speech is not made). Thus, it is determined that the personal authentication has failed, and the process proceeds to step S8. In step S8, the control unit 11 generates the image signal for the alert display such as, for example, "personal authentication failed" and outputs the image signal to the display control unit 14. The display control unit 14 superimposes this alert display over the video signal from the imaging unit 12 and causes the display 15 to display the image. Then, the process returns to step S1, and the subsequent steps are repeated.

If the object person has not moved from the imaging range again in step S1, the process proceeds to step S3. Herein, if the unregistered object person speaks the command (e.g., "register face") for instructing registration, the speech content is recognized. Then, through step S4, the process proceeds to step S9.

In step S9, the control unit 11 sets the image processing unit 13 to the registration mode. Further, the control unit 11 determines whether the speech content of the object person (or registrant) is "register face", and the process proceeds to step S10 in the case of "register face". Note that the process proceeds to step S12 when the speech content of the registrant is not "register face".

For now, the speech content should be recognized as "register face", and thus the process proceeds to step S10.

In step S10, the face region detection unit 21 outputs the face region of the object person detected from the video signal from the imaging unit 12 to the face registration unit 22. The face registration unit 22 calculates the feature amount based on the face region input from the face region detection unit 21. At this time, the display 15 may be caused to display the alert display such as, for example, "please take off your glasses" or "please face forward (or turn to your right or left)". In step S11, the face registration unit 22 registers the calculated feature amount of the face in the feature amount DB 24.

A process (referred to below as face registration process) in steps S10 and S11 is described in detail. FIG. 3 is a flowchart illustrating the face registration process.

In step S31, the face registration unit 22 detects each part (i.e., eyebrow, eye, nose, mouth, or the like) of the face from the face region input from the face region detection unit 21.

Next, in step S32, the position or direction of the entire face is adjusted based on the position of each detected part. The face region is cut out again to include the entire face in the adjusted position or direction in step S33, and the feature amount is calculated and output to the feature amount DB 24 in step S34. In step S35, the feature amount DB 24 registers the feature amount of the face input from the face registration unit 22.

After registration of (the feature amount of) the face in a manner described above, the display 15 is caused to display the alert display such as, for example, "face registration complete", and the process returns to step S1 in FIG. 2.

If the object person has not moved from the imaging range again in step S1, the process proceeds to step S3. Herein, if the object person (or registrant) having only the face already registered speaks the command "register password" for instructing registration of the password, the speech content is recognized. Then, through step S4, the process proceeds to step S9.

For now, the speech content of the registrant is not "register face", and thus the process proceeds to step S12 through step S9.

The control unit 11 determines whether the speech content of the registrant is "register password" in step S12, and the process proceeds to step S13 in the case of "register password". Note that the process proceeds to step S16 when the speech content of the registrant is not "register password", i.e., when the speech content is "register".

For now, the speech content should be recognized as "register password", and thus the process proceeds to step S13.

In step S13, the control unit 11 causes the display 15 to display the alert display such as, for example, "please say the password to be registered". If the object person speaks an arbitrary password accordingly, an image is taken to input the face region to the speech registration unit 23.

In step S14, the speech registration unit 23 detects the lip of the object person when the password is spoken based on the input face region and calculates the feature amount (i.e., the time series of feature amount) of the movement. Further, in step S15, the calculated feature amount of the lip movement is registered in the feature amount DB 24 to be associated with the feature amount of the face of the registrant registered in step S11.

A process (referred to below as speech registration process) in steps S14 and S15 is described in detail. FIG. 4 is a flowchart illustrating the speech registration process.

The speech registration unit 23 detects a lip region including the lip from the face region input from the face region detection unit 21 in step S41 and cuts out the lip region from the face region in step S42. Further, a speech section in which the lip is moving is cut out from time series of the lip region in step S43, and a feature amount of the lip region in the speech section is calculated and output to the feature amount DB 24 in step S44. In step S45, the feature amount DB 24 registers time series of feature amount of the lip input from the speech registration unit 23 to be associated with the feature amount of the face registered in step S11.

After registration of (the time series of feature amount of) the password in a manner described above, the display 15 is caused to display the alert display such as, for example, "password registration complete", and the process returns to step S1 in FIG. 2.

From this point on, the personal authentication can succeed by speaking the correct password, since the face and the password of the object person is already registered.

Note that although a case where a face registration and a password registration are done separately has been described in the example described above, it is also possible to perform the face registration and the password registration together. In that case, the object person is to speak "register" as the command for instructing registration at the stage of step S3. Accordingly, the process proceeds in the order of steps S4, S9, S12, and S16. Then, in steps S16 and S17, the face registration process and a password registration process described above are performed continuously or performed together.

Note that, when the face registration process and the password registration process are performed together in steps S16 and S17, the feature amount of the face when the password is spoken, i.e., when the lip is moving, is calculated. In this manner, the feature amount of the face when the lip is moving is considered to represent a feature of the object person more distinctly compared to the feature amount of the face when not speaking. Thus, performing the face registration process and the password registration process together is considered to increase the accuracy of the personal authentication compared to when only the face registration process is performed.

Returning to step S1 again, the process proceeds in the order of steps S1, S4, and S5 if the correct password is spoken in the imaging range of the imaging unit 12 by the object person whose face and password are already registered.

In step S5, the feature amount of the face of the object person is calculated to determine whether the face is already registered. For now, it is determined as already registered. Also, the time series of the speech content (i.e., password) is calculated to determine whether the speech content matches with that already registered in association with the registered face. For now, it is determined as a match.

For now, in step S6, the object person is determined as a registered person in the facial identification result and the speech recognition result is determined as a match with the password associated with the registered person. Thus, the personal authentication is determined as a success, and the process proceeds to step S18.

In step S18, the control unit 11 notifies the unlocking unit 16 of the success of the personal authentication. Accordingly, the unlocking unit 16 unlocks the door to the security area, for example. Then, the personal authentication process is temporarily terminated.

With the personal authentication process described above, the personal authentication can be performed with higher accuracy compared to when only the facial identification is performed, without providing an input device other than the imaging unit 12.

Accordingly, the object person can go through the personal authentication even with both hands holding luggage or the like, as long as the face can be captured.

Also, since the time series of feature amount of the lip when the password is spoken is associated with the feature amount of the face of a speaker, the personal authentication can be performed with higher accuracy compared to when the password is recognized merely as a character string to determine a match thereof.

Further, since the password is spoken without an actual voice, leakage of the password through eavesdropping or the like can be prevented. In addition, it is possible to input the password through speech even in a noisy environment.

Moreover, the object person (or registrant) can register as the password an arbitrary word or sound which is beyond what can be represented by a character string.

Note that anyone who knows the command for instructing registration can register his/her face and password, according to the description above. Thus, for example, the feature amount of a face of a manager and the time series of feature amount of the lip movement when the command for instructing registration is spoken by the manager may be registered in association with each other. Then, only at the time of registration, the command for instructing registration is spoken by the manager, and then the object person (or registrant) registers his/her face and password.

Note that an embodiment of the present invention can be applied not only to an unlocking device as in this embodiment but also to any device which executes a predetermined process according to success or failure of the personal authentication.

A process sequence described above can be executed with hardware or can be executed with software. When the process sequence is to be executed with software, a program forming the software is installed from a program recording medium on a computer built in dedicated hardware or, for example, a general personal computer capable of executing various functions by installing various programs.

FIG. 5 is a block diagram showing a configuration example of hardware of a computer which executes the process sequence described above through a program.

In this computer 100, a central processing unit (CPU) 101, a read only memory (ROM) 102, a random access memory (RAM) 103, and a bus 104 are interconnected.

The bus 104 is further connected with an input-output interface 105. The input-output interface 105 is connected with an input unit 106 including a keyboard, a mouse, and a microphone, an output unit 107 including a display and a speaker, a storage unit 108 including a hard disk or a nonvolatile memory, a communication unit 109 including a network interface, and a drive 110 which drives a removable medium 111 such as a magnetic disk, an optical disc, a magneto-optical disk, or a semiconductor memory.

In the computer 100 configured in a manner described above, the process sequence described above is performed by, for example, the program stored in the storage unit 108 being loaded and executed in the RAM 103 by the CPU 101 via the input-output interface 105 and the bus 104.

Note that the program executed by the computer may be a program which performs the processes in the chronological order described in this specification or may be a program which performs the processes in parallel or at appropriate timings such as upon a call.

Also, the program may be intended for processing with one computer or may be intended for distributed processing with more than one computer. Further, the program may be transferred to and executed on a remote computer.

The present application contains subject matter related to that disclosed in Japanese Priority Patent Application JP 2010-070495 filed in the Japan Patent Office on Mar. 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device which performs personal authentication based on a video signal obtained through imaging of an object person, comprising:
   imaging means for performing imaging of one of the object person and a registrant to generate the video signal;
   first feature amount calculation means for calculating a feature amount of a face of the registrant in an image of the video signal obtained through imaging of the registrant in a registration mode;

second feature amount calculation means for calculating time series of feature amount of a lip of the registrant in an image of the video signal obtained through imaging of the registrant speaking an arbitrary password in the registration mode;

registration means for registering the calculated time series of feature amount of the lip when the arbitrary password is spoken in a database to be associated with the calculated feature amount of the face of the registrant;

identification means for calculating a feature amount of a face in an image of the video signal obtained through imaging of the object person, referencing the database, and identifying the face of the object person in an authentication mode;

recognition means for calculating time series of feature amount of a lip of the object person in an image of the video signal obtained through imaging of the object person while speaking, referencing the database, and recognizing speech content of the object person in the authentication mode; and authentication means for performing personal authentication of the object person based on an identification result of the face of the object person and a recognition result of the speech content of the object person.

2. The information processing device according to claim 1, wherein the recognition means recognizes the speech content of the object person based on whether the calculated time series of feature amount of the lip of the object person matches with the time series of feature amount of the lip when the arbitrary password is spoken by the registrant already registered in the database.

3. The information processing device according to claim 2, further comprising:

mode switching means;

wherein the recognition means further calculates the time series of feature amount of the lip of the registrant in an image of the video signal obtained through imaging of the registrant while speaking, references the database, and recognizes speech content of the registrant in the authentication mode; and wherein the mode switching means switches from the authentication mode to the registration mode according to the recognized speech content of the registrant.

4. The information processing device according to claim 2, wherein the first feature amount calculation means calculates the feature amount of the face of the registrant in an image of the video signal obtained through imaging of the registrant while speaking in the registration mode, and wherein the identification means calculates the feature amount of the face in an image of the video signal obtained through imaging of the object person while speaking, references the database, and identifies the face of the object person in the authentication mode.

5. An information processing method performed by an information processing device which performs personal authentication based on a video signal obtained through imaging of an object person, the method comprising:

a first feature amount calculation step of calculating with a computer a feature amount of a face of a registrant in an image of the video signal obtained through imaging of the registrant in a registration mode;

a second feature amount calculation step of calculating with the computer time series of feature amount of a lip of the registrant in an image of the video signal obtained through imaging of the registrant speaking an arbitrary password in the registration mode;

a registration step of registering the calculated time series of feature amount of the lip when the arbitrary password is spoken in a database to be associated with the calculated feature amount of the face of the registrant;

an identification step of calculating a feature amount of a face in an image of the video signal obtained through imaging of the object person, referencing the database, and identifying the face of the object person in an authentication mode;

a recognition step of calculating time series of feature amount of a lip of the object person in an image of the video signal obtained through imaging of the object person while speaking, referencing the database, and recognizing speech content of the object person in the authentication mode; and an authentication step of performing personal authentication of the object person based on an identification result of the face of the object person and a recognition result of the speech content of the object person.

6. A non-transitory computer readable medium having stored therein a program for controlling an information processing device which performs personal authentication based on a video signal obtained through imaging of an object person, the program when executed by a computer of the information processing device executed a process comprising:

a first feature amount calculation step of calculating with the computer a feature amount of a face of a registrant in an image of the video signal obtained through imaging of the registrant in a registration mode;

a second feature amount calculation step of calculating with the computer time series of feature amount of a lip of the registrant in an image of the video signal obtained through imaging of the registrant speaking an arbitrary password in the registration mode;

a registration step of registering the calculated time series of feature amount of the lip when the arbitrary password is spoken in a database to be associated with the calculated feature amount of the face of the registrant;

an identification step of calculating a feature amount of a face in an image of the video signal obtained through imaging of the object person, referencing the database, and identifying the face of the object person in an authentication mode;

a recognition step of calculating time series of feature amount of a lip of the object person in an image of the video signal obtained through imaging of the object person while speaking, referencing the database, and recognizing speech content of the object person in the authentication mode; and an authentication step of performing personal authentication of the object person based on an identification result of the face of the object person and a recognition result of the speech content of the object person.

7. An information processing device which performs personal authentication based on a video signal obtained through imaging of an object person, comprising:

an imaging unit configured to perform imaging of one of the object person and a registrant to generate the video signal;

a first feature amount calculation unit configured to calculate a feature amount of a face of the registrant in an image of the video signal obtained through imaging of the registrant in a registration mode;

a second feature amount calculation unit configured to calculate time series of feature amount of a lip of the registrant in an image of the video signal obtained through imaging of the registrant speaking an arbitrary password in the registration mode;

a registration unit configured to register the calculated time series of feature amount of the lip when the arbitrary password is spoken in a database to be associated with the calculated feature amount of the face of the registrant;

an identification unit configured to calculate a feature amount of a face in an image of the video signal obtained through imaging of the object person, reference the database, and identify the face of the object person in an authentication mode;

a recognition unit configured to calculate time series of feature amount of a lip of the object person in an image of the video signal obtained through imaging of the object person while speaking, reference the database, and recognize speech content of the object person in the authentication mode; and an authentication unit configured to perform personal authentication of the object person based on an identification result of the face of the object person and a recognition result of the speech content of the object person.

* * * * *